(12) United States Patent
Cao et al.

(10) Patent No.: US 8,955,129 B2
(45) Date of Patent: Feb. 10, 2015

(54) METHOD AND SYSTEM FOR DETECTING FAKE ACCOUNTS IN ONLINE SOCIAL NETWORKS

(71) Applicants: Qiang Cao, Durham, NC (US); Michael Sirivianos, Nicosia (CY); Xiaowei Yang, Durham (NC)

(72) Inventors: Qiang Cao, Durham, NC (US); Michael Sirivianos, Nicosia (CY); Xiaowei Yang, Durham (NC)

(73) Assignees: Duke University, Durham, NC (US); Telefonics Digital Espana, S.L.U., Madrid (ES)

( * ) Notice: Subject to any disclaimer, the term of this patent is extended or adjusted under 35 U.S.C. 154(b) by 106 days.

(21) Appl. No.: 13/868,331

(22) Filed: Apr. 23, 2013

(65) Prior Publication Data

US 2014/0317736 A1    Oct. 23, 2014

(51) Int. Cl.
*G06F 11/00*     (2006.01)
*H04L 29/06*     (2006.01)

(52) U.S. Cl.
CPC ............................... *H04L 63/1483* (2013.01)
USPC .......................................................... 726/23

(58) Field of Classification Search
USPC .......................................................... 726/23
See application file for complete search history.

(56) References Cited

U.S. PATENT DOCUMENTS

| | | | | |
|---|---|---|---|---|
| 7,805,518 | B1 * | 9/2010 | Kamvar et al. | 709/227 |
| 2011/0246457 | A1 * | 10/2011 | Dong et al. | 707/725 |
| 2013/0254280 | A1 * | 9/2013 | Yang et al. | 709/204 |
| 2013/0263226 | A1 * | 10/2013 | Sudia | 726/4 |
| 2013/0296039 | A1 * | 11/2013 | Engineer et al. | 463/29 |
| 2014/0040152 | A1 * | 2/2014 | Fang et al. | 705/319 |
| 2014/0189000 | A1 * | 7/2014 | Zhang et al. | 709/204 |

(Continued)

OTHER PUBLICATIONS

Yu H, et al., "SybilGuard: Defending Against Sybil Attacks Via Social Networks", SIGCOMM'06, 2006, pp. 267-278.

(Continued)

*Primary Examiner* — Teshome Hailu
(74) *Attorney, Agent, or Firm* — Gary J. Gershik; Cooper & Dunham LLP

(57) ABSTRACT

A system and method for detecting fake accounts in OSNs is proposed to aid the OSN provider 20 against fake users, wherein a social graph G of the OSN, with n nodes, a non-Sybil region $G_H$ and a Sybil region $G_S$, is obtained and the following steps are performed:

a trust value $T^{(i)}(v)$ is computed through i power iterations on each node v of the social graph G, i=0, 1, ... O(log n)

the power iterations distribute the trust value $T^{(i)}(v)$ from each node v to its neighbor nodes, after O(log n) power iterations, ranking nodes by a degree-normalized trust $$\hat{T}_v = \frac{T^{(w)}(v)}{\deg(v)}$$

in order to obtain a ranked list of nodes,
  detecting fake accounts based on the obtained ranked list
  assigning intervals in the ranked list to a fake portion, determined by manual inspection means of the OSN provider, based on the degree-normalized trust of the nodes belonging to the intervals.

17 Claims, 5 Drawing Sheets

(56) References Cited

U.S. PATENT DOCUMENTS

| | | | |
|---|---|---|---|
| 2014/0189536 A1* | 7/2014 | Lange et al. | 715/753 |
| 2014/0279623 A1* | 9/2014 | Mislove et al. | 705/319 |
| 2014/0282977 A1* | 9/2014 | Madhu et al. | 726/7 |

OTHER PUBLICATIONS

Yu H, et al., "SybilLimit: A Near-Optimal Social Network Defense Against Sybil Attacks", IEEE/ACM Transactions on Networking, 2010, vol. 18 No. 3, pp. 885-898.

Mohaisen A, et al., "Keep your Friends Close: Incorporating Trust Into Social Network-based Sybil Defenses", Univ. of Minnesota, Proceedings—IEEE INFOCOM, 2011 [abstract].

Danezis G, and Mittal P, "SybilInfer: Detecting Sybil Nodes Using Social Networks", Microsoft Research, University of Illinois at Urbana-Champaign, Jan. 12, 2009.

Tran N, et al., "Sybil-Resilient Online Content Voting", USENIX Association, 2009, pp. 15-28.

Tran N, et al., "Optimal Sybil-resilient Node Admission Control", New York University, 2010.

Sirivianos M, et al., "On the Internet, "Am I Really not a Dog?" Assessing the Veracity of Identity Assertions via OSNs", 2010.

Zhao Y, et al., "BotGraph: Large Scale Spamming Botnet Detection", USENIX Association, 2009 pp. 101-104.

Post A, et al., "Bazaar: Strengthening user reputations in online marketplaces", USENIX Association, 2011.

Haveliwala TH, "Topic-Sensitive PageRank: A Context-Sensititive Ranking Algorithm for Web Search", Stanford University, 2002, pp. 1-22.

Page L, and Brin S, Motwani R and Winograd T, "The PageRank Citation Ranking: Bringing Order to the Web", 1998, pp. 1-17.

Lin F, Cohen WW, "Power Iteration Clustering", Carnegie Mellon University, 2010.

Mislove A, et al., "You are Who You Know: Inferring User Profiles Social Networks," WSDM'10, 2010.

\* cited by examiner (STATE OF THE ART)

METHOD AND SYSTEM FOR DETECTING
FAKE ACCOUNTS IN ONLINE SOCIAL
NETWORKS

FIELD OF THE INVENTION

The present invention has its application within the telecommunication sector, and especially, relates to Online Social Networking (OSN) services, such as Facebook, Twitter, Digg, LinkedIn, Google+, Tuenti, etc., and their security mechanisms against to Sybil attacks.

BACKGROUND OF THE INVENTION

The Sybil attack in computer security is an attack on a system that comprises of is multiple distinct entities (e.g., a peer-to-peer system or an Online Social Network) wherein the attacker forges and controls multiple pseudonymous (fake) identities. The attacker uses the fake identities to gain a disproportionately large influence and subvert the system, such as manipulating a vote result. In an electronic network environment, particularly in social networks, Sybil attacks are commonplace due to the open nature of these platforms. With a Sybil attack a malicious user creates multiple fake identities or fake OSN accounts and pretends to be multiple distinct nodes in the system.

Fake (Sybil) OSN accounts can be used for various profitable malicious purposes, such as spamming, click-fraud, malware distribution, identity fraud and phishing, to name but a few. For instance, they enable spammers to abuse an OSN's messaging system to post spam, or they waste an OSN advertising customers resources by making him pay for online ad clicks or impressions from or to fake profiles. Fake accounts can also be used to acquire users' private contact lists, to increase the visibility of niche content, to post on forums and to manipulate votes or view counts on pages. Sybils can use the "+1" button to manipulate Google search results or to pollute location crowdsourcing results. Furthermore, fake accounts can be used to access personal user information and perform large-scale crawls over social graphs. Some fake accounts are used to spread inappropriate or illegal content such as pornography and extreme violence. Fake accounts are also used in political to campaigns. People also create fake profiles for social reasons. These include friendly pranks, stalking, cyber-bullying, and concealing a real identity to bypass real-life constraints. Many fake accounts are also created for the purpose of joining online social games.

Typically, fake accounts tend to connect to fake accounts. For instance, porn is accounts often have friends that are also porn accounts. Fake celebrities also have friends that are fake celebrities. There are also long chains of fake accounts that are created for spam purposes which appear empty (no photos, no wall) and their friends are also fake and empty.

Due to the multitude of the reasons behind their creation, Sybils in real OSNs manifest numerous and diverse profile features and activity patterns. Thus, feature-based Sybil detection (e.g., Machine-Learning-based) rarely yields desirable accuracy. As a result, the detected accounts cannot be automatically suspended due to the high rate of false positives. Instead, OSNs are employing a time-consuming manual account verification process driven by user-reports on abusive accounts and automated classifiers. However, only a small fraction of the inspected accounts are indeed fake, which signifies an inefficient use of human labor.

If an OSN provider could detect Sybil nodes in its system effectively, the experience of its users and their perception of the service could be improved by stemming annoying spam messages and invitations. The OSN provider would also be able to increase the marketability of its user base and its social graph for advertising purposes, and to enable other online services or distributed systems to use a user's OSN identity as an authentic digital identity, a vision foreseen by recent efforts such as Facebook Connect.

On the other hand, although social-graph-based Sybil defences have been extensively discussed in the research community (they are briefly described below) there has been little evidence of wide industrial adoption due to their shortcomings in terms of effectiveness and efficiency.

Social-network-based Sybil detection mechanisms rely on the properties of a social is network graph to separate Sybils from non-Sybil users. Yu et al. pioneered the field with two approaches of Social-network-based Sybil detection mechanisms: SybilGuard and SybilLimit, both of which sample random route (a special type of random walk) traces to infer Sybils. Both mechanisms bound the number of accepted Sybils based on the assumption that the attack edges between Sybils and non-Sybils form a minimum quotient cut in the social network.

SybilGuard, disclosed in "SybilGuard: Defending Against Sybil Attacks via Social Networks", SIGCOMM, 2006, by Yu et al., bounds the number of accepted Sybils per attack edge to $O(\sqrt{n} \log n)$, where n is the number of non-Sybil nodes in a social network and when the number of attack edges is on the order of $o(\sqrt{n} \log n)$.

SybilLimit, disclosed in "SybilLimit A Near-Optimal Social Network Defense Against Sybil Attacks", IEEE S&P, 2008, by Yu et al., improves over SybilGuard and limits the number of accepted Sybils per attack edge to $O(\log n)$, when the number of attack edges is $o(n/\log n)$.

SybilGuard and SybilLimit are designed to provide the above guarantees in a decentralized setting where each node acts as a verifier and independently decides whether to accept another node as a non-Sybil.

The solution proposed by Mohaisen et al. In "Keep your friends close: Incorporating trust into social network-based Sybil defensas", INFOCOM, 2011, strengthen existing Sybil defenses, such as SybilLimit, by incorporating social trust into random walks. to Mohaisen et al. observe that some social networks have a higher mixing time than assumed in previous work, and propose to use weighted random walks where the node transition probability to a neighbor is weighted by the pairwise trust between nodes. The mixing time of a social network is the maximum number of steps that a random walk needs to traverse so that the probability of landing at each node is reaches the stationary distribution. The stationary distribution describes the probability of landing at each node after an infinite number of steps.

Other existing social-graph-based Sybil defences include the following:

SybilInfer, described in "SybilInfer Detecting Sybil Nodes using Social Networks.", NDSS, 2009, by Danezis et al., infers the probability of a suspect user being non-Sybil in centralized systems. It also assumes attack edges form a sparse cut in a social network. It uses a machine learning method, the Metropolis-Hastings (MH) algorithm, to sample N non-Sybil user sets based on random-walk traces. Counting the user occurrence in N samples, SybilInfer generates a marginal probability for each node being non-Sybil. The marginal probability distribution is close to uniform in the absence of a Sybil attack, whereas it skews towards non-Sybil users under an attack. However, unlike SybilLimit and SybilGuard, SybilInfer does not specify the expected number of Sybils accepted per attack edge (false negatives) or the likelihood that a non-Sybil is declared as a Sybil user (false positives). SybilInfer also incurs a higher computation cost: $O(s\,n\,(\log n)^2)$, where s is the number of trusted (referred to as honest) seeds.

SumUp, described in "Sybil-Resilient Online Content Rating", NSDI, 2009, by Tran et al. is an online vote collection system that exploits the social network graph to discard votes from Sybil users. It defines a voting region in the network by assigning decreasing numbers of tickets (used as link capacity) to links with increasing to distances from a trusted vote collector, and approximates the multiple-source max-flow from the voters to a single trusted vote collector.

GateKeeper, described in "Optimal Sybil-resilient Node Admission Control", INFOCOM, 2011, by Tran et al., builds on SumUp to admit non-Sybil users in a distributed system. It uses multiple ticket sources to reduce the probability that non-Sybil users do not receive tickets. In random expander social networks, GateKeeper accepts $O(\log g)$ Sybils per attack edge, where g is the number of attack edges and g is in the order of $O(n/\log n)$. It costs $O(s\,n\,\log n)$, because the computational cost of each max flow heuristic run is $O(n \log n)$.

Sirivianos et al. describe a maximum-flow-based method (called MaxTrust) for assigning scores on users that depend on their likelihood to be Sybils, as disclosed in "Assessing the Veracity of Identity Assertions via OSNs", COMSNETS, 2012. The costs of MaxTrust is $O(T_{max}\,n\,\log n)$. The integer value $T_{max}$ determines the granularity of the scoring.

BotGraph, disclosed in "BotGraph: Large Scale Spamming Botnet Detection", NSDI, 2009, by Zhao et al. detects bot-users by constructing a large user-user graph based on shared email IP addresses and looking for tightly connected user groups. This technique is also applicable in social graphs to detect bot(fake) users.

Unlike the aforementioned Sybil detection mechanisms, which aim at explicitly distinguishing Sybils from non-Sybil users, another approach is to use a Sybil-resilient design that aims to make a particular application (e.g., a recommendation system or a DHT) resilient to Sybil attacks. For Instance, Post et al. propose Bazaar, described in "Bazaar Strengthening User Reputations in Online Marketplaces", USENIX NSDI, 2011, which is an improved reputation system for online marketplaces. A key advantage of this design approach is that it can use application-specific knowledge to mitigate Sybils in the application, such as limiting the number of votes collected from Sybil users. However, a Sybil-resilient design optimized for an application may not be applicable to other systems, while a social-network-based Sybil detection mechanism identifies potential Sybils, and can be applied to all applications where users have social connections.

Some reputation systems use the power iteration method, which simulates a random surfer's walk across the web pages, beginning at a state and running the (random) walk for a large number of steps and keeping track of the visit frequencies for each of the states. A random walk is a mathematical formalization of a path that consists of a succession of random steps. PageRank reflects the stationary distribution of a random walk that at each step, with a probability $\epsilon$, usually called the teleport probability, jumps to a random node and with probability $1-\epsilon$ follows a random outgoing edge from the current node.

Personalized PageRank ("Topic-sensitive pagerank" by Haveliwala at al., WWW '02: Proceedings of the 11th international conference on World Wide Web, pages 517-526, 2002), EigenTrust ("The EigenTrust algorithm for reputation management in P2P networks" by García-Molina et al., WWW '03 Proceedings of the 12th international conference on World Wide Web, p. p. 640-651, 2003) and TrustRank ("Combating Web Spam with TrustRank" by García-Molina et al., VLDB, 2004) are trust Inference mechanisms that use power iteration to compute the stationary a distribution, which describes the probability of a random walk starting from one or multiple trust seeds to land at a node. Trust seeds are nodes that are a priori considered trustworthy and are used to initialize the trust computation. The power iteration includes a reset probability for the random walk to jump back to trust seeds. They use this distribution to assess how close and connected a node is to the trust to seeds, a metric that reflects how trustworthy a node is. However, these methods cannot be used to accurately detect Sybils, because non-Sybils far from and Sybils close to the seeds obtain low and high trust ranks, respectively.

The technical report "The PageRank citation ranking: Bringing order to the web", Stanford InfoLab, 1999, by Page et al., describes the PageRank method, which uses is power iteration in a similar fashion as EigenTrust, TrustRank and Personalized PageRank, but with a constant reset probability jumping to random nodes in the directed graph. However, PageRank is not Sybil-mitigating because its random walks are reset to any random node, including Sybils.

Lin et al. disclose in "Power Iteration Clustering" ICML, 2010, the use of (an early-terminated) power iteration to cluster a set of vectors based on a similarity matrix. However, the early-terminated power iteration does not compute the probability of a random walk landing at a node. Thus, it is unclear how to apply this method to effectively detect Sybils.

Viswanath et al. proposed community detection (CD) algorithms such as Mislove's algorithm, disclosed in "You are Who you Know: Inferring User Profiles in Online Social Networks", ACM WSDM, 2010, for Sybils detection. However, CD algorithms do not provide provable guarantees and Mislove's CD algorithm costs $O(n^2)$.

In response to the inapplicability of automated account suspension, OSNs employ CAPTCHAs (standing for "Completely Automated Public Turing test to tell Computers and Humans Apart") to rate-limit suspected users or manually inspect the features of accounts reported as abusive by other users. The inspection involves matching profile photos to the age or address, understanding natural language in posts, examining the friends of a user, etc. Confirmed fake accounts are always suspended or deleted. However, these tasks require human intelligence and intuition, which makes them hard to be automated and to scale up.

Due to the high false positives of binary Sybil/non-Sybil existing classifiers, manual inspection needs to be part of the decision process for suspending an account Consequently, it is desirable to efficiently derive a quality ranking, in which a substantial portion of Sybils ranks low and enables the OSN provider to focus its is manual inspection efforts towards the end of the list, where it is more likely to encounter Sybils.

Therefore, there is a need in the state of the art for a method for unveiling fake OSN accounts that reliably allows human verifiers to focus on a small number of user accounts that are very likely to be fake (Sybil accounts), and to provide the OSN provider with a ranking list to assist with determining whether to challenge suspicious users, for instance by means of CAPTCHAs.

SUMMARY OF THE INVENTION

The present invention solves the aforementioned problems by disclosing a method, system and computer program that detects Sybil accounts in an Online Social Network (OSN) by ranking users of the OSN in terms of their likelihood of being fake (Sybils), computed as the probability of short $O(\log$ n)-length random walks to land at each node of the OSN, where n is the number of nodes in the OSN, by performing early-terminated power iterations.

The present invention terminates the power iteration early without reaching a stationary distribution, and uses it to compute a degree-normalized probability of a random walk landing at a node: it divides the landing probability by the node degree, to ensure that the likelihood of users being Sybil is not affected by the number of their to neighbours, which is a number that can be easily manipulated by Sybils. The computed probability is roughly independent of a node's distance to the trust seeds. Unlike existing eigenvector-based methods, such as EigenTrust, TrustRank and Personalized PageRank, the random walks in the present invention are not reset to the user which they start from (seed) at each step with a fixed probability, instead is they are just stopped early after O(log n) steps. As a result, the present invention can effectively distinguish Sybils from non-Sybils almost regardless of their distances from the trust seeds. In addition, due to its use of the power iteration method, it supports multiple trust seeds at no additional computational cost. The present invention facilitates the use of multiple trust seeds to increase the system's robustness to seed selection errors, such as designating a Sybil as a seed. The present invention also allows the OSN to cope with the multi-community structure of online social graphs. Thus, the present invention enables to seed trust in each detected community and allows the OSN provider to avoid mistaking communities that are weakly connected to the core network as Sybils.

The degree normalization is unique to the present invention, because the landing probability in the stationary distribution is proportional to the node degree. The degree-normalized probability of a random walk landing at a node provides a provable upper bound on high-ranked Sybils. In contrast, since the node trust is not simply proportional to the node degree in trust inference schemes such as a PageRank, EigenTrust, Personalized PageRank and TrustRank, the direct application of degree normalization to these prior-art mechanisms cannot improve them.

In the context of the invention, the degree of a node is defined as in graph theory, wherein the degree of a vertex (node) of a graph is the number of edges incident to to the vertex (adjacent nodes), with loops counted twice. In an undirected social graph, modelling a OSN, the degree of a node is the number of edges connected to this node. Edges of the OSN social graph represent trust relationships between people. A friendship relationship is assumed to be an undirected edge in the social graph. Such an edge indicates that two nodes trust each other to not be part of a Sybil attack. Furthermore, the friendship relationship between an attacker node and an honest node is denoted as an attack edge and the honest node connected to an attacker node is a naive or misguided node.

The present invention has its application to Sybil inference customized for OSNs whose social relationships are bidirectional. The foundational assumption is the same as in the prior-art social-graph-based defences: that OSN Sybils have a disproportionately small number of connections to non-Sybil users. But a main advantageous difference of the invention with respect to prior-art social-graph-based solutions is that the present invention achieves significantly higher detection accuracy at a substantially lower computational cost, even in large scale OSNs. Also, the present invention can be implemented in a parallel computing framework using commodity machines. In addition, the present invention provides a proactive scheme that is able to identify potential malicious accounts before they induce harm in the form of unsolicited communication on the OSN and its users. The social-graph-based method proposed below allows a multi-million-user OSN provider to pick up accounts that are very likely to be Sybils and to stem malicious activities in its network. For instance, it can enable human verifiers of the OSN to focus on likely-to-be-fake accounts and also to guide the OSN in the sending of CAPTCHA challenges to suspicious accounts, while running a lower risk to annoy legitimate users.

According to a first aspect of the present invention, a method of fake (Sybil) accounts detection in OSNs is disclosed. The method starts from obtaining a social graph G of the OSN, the social graph G comprising n nodes and two disjoint regions, a non-Sybil region $G_H$ and a Sybil region $G_S$, and the method comprises the following steps:

computing a trust value $T^{(i)}(v)$ by i power iterations on each node v of the is social graph G, where i=0, 1, ... O(log n);

the power iterations distribute the trust value $T^{(i)}(v)$ from each node v to its neighbour nodes, through the entire social graph G with a bias towards the non-Sybil region $G_H$;

after an early ending number w=O(log n) of power iterations, ranking nodes by a degree-normalized trust to obtain a ranked list of nodes, the trust value $T^{(i)}(v)$ of the node v being normalized by the degree deg(v) of said node v to compute the degree-normalized trust of the node v;

detecting fake accounts in the Sybil region $G_S$ based on the obtained ranked list.

In a second aspect of the present invention, a communication system, integrated in a communication network comprising a plurality of nodes, for detecting fake accounts in a OSN is provided, the system implementing the method described before by comprising:

computational means adapted to compute a trust value $T^{(i)}(v)$ through i power iterations on each node v of the social graph G of the OSN, where i=0, 1, ... O(log n) and n being the number of nodes in the social graph G;

communication means to distribute the trust value $T^{(i)}(v)$ by the power iterations, obtained by the computational means, from each node v to its neighbour nodes, through the entire social graph G with a bias towards the non-Sybil region $G_H$;

node ranking means adapted to rank nodes, after an early ending number w=O(log n) of power iterations, by a degree-normalized trust to obtain a is ranked list of nodes, the degree-normalized trust of the node v being computed based on dividing the trust value $T^{(i)}(v)$ by the degree deg(v) of the node v in the social graph G;

account detection means adapted to detect fake accounts in the Sybil region $G_S$ based on the ranked list obtained by the node ranking means.

In a third aspect of the present invention, a computer program is disclosed, comprising computer program code means adapted to perform the steps of the described method when said program is run on a computer, a digital signal processor, a field-programmable gate array, an application-specific integrated circuit, a micro-processor, a micro-controller, or any other form of programmable hardware. Also a digital data storage medium storing a computer program product is provided, comprising instructions causing a computer executing the program, to perform all steps of the method described before.

The method and system in accordance with the above described aspects of the invention has a number of advantages with respect to prior art, summarized as follows:

The present invention is an effective and efficient Sybil-likelihood ranking to scheme for OSN users based on efficiently computable early-terminated random walks which uses power iteration to efficiently compute the landing probability of random walks in large graphs. This power iteration is terminated early without reaching a stationary distribution. Compared to the early-terminated Power Iteration Clustering (PIC) presented by Lin et al., PIC formally calculates the right principal eigenvectors while the present invention calculates the left principal eigenvectors.

Having assumed that attack edges form a minimum quotient cut to bound the expected number of accepted Sybils, which is the same assumption used in SybilLimit and SybilInfer, the present invention is computationally more efficient than these approaches in a centralized setting. The present invention achieves analytically equivalent and experimentally better detection accuracy compared to SybilLimit and SybilInfer. At the same time, SybilLimit, although it has a better computational cost than SybilInfer, it still costs $O(\sqrt{nm} \log n)$ has a high $O(\sqrt{nm} \log n)$ computational cost, where m is the number of edges in the social network. SybilLimit's cost compares very unfavorably to the $O(n \log n)$ computational cost of the present invention. Also compared to approaches that use different graph properties, e.g., GateKeeper and Mislove's community detection algorithm, the present invention achieves equivalent accuracy analytically and is also computationally more efficient. This is because each power iteration by the present invention costs $O(n)$, given a social graph with n nodes, and the present invention iterates $O(\log n)$ times, so the total computational cost of determining the nodes' degree-normalized trust is $O(n \log n)$. The cost for ranking the nodes according to their degree-normalized trust is also $O(n \log n)$ irrespective of the number of seeds.

The MaxTrust method has a computational cost $O(T_{max} n \log n)$, the integer value $T_{max}$ being determined by the granularity of the scoring. In the present invention, to the trust value $T_{max}$ can be assigned to any computable real number in $[0,1]$, while MaxTrust can assign only integer values in $[0,T_{max}]$. As a result, enabling MaxTrust to have as high accuracy (fine-granularity in scoring) as the present invention would require $T_{max}$ times more computational cost, where $T_{max}$ must be a sufficiently high value, e.g., 100.

The present invention effectively distinguishes Sybils from non-Sybils almost independently of their distances from the trust seeds. Mohaisen et al. incorporated social trust into random walks but follow the random walk sampling paradigm instead of the power-iteration method, incurring as high a detection cost as SybilLimit. The detection accuracy of the present invention depends on the mixing time difference between the Sybil and non-Sybil region of a graph, not the absolute mixing time of the social graph. Thus, the present invention still uses the uniform random walks where a node's transition probability is proportional to a node's degree.

The present invention significantly simplifies the trust seed selection process. After power iterations equal to the mixing time, each non-Sybil node obtains almost identical degree-normalized trust that is largely independent of its distance to the trust seeds. Due to this property, any node in the non-Sybil region can be selected to be a trust seed. In contrast, previous work in trust inference such as TrustRank and Sybil defences such as SumUp tend to assign high trust or give acceptance preference to nodes that are close to the trust seeds. This implies that in a these schemes, e.g. TrustRank and SumUp, the seeds should be far away from the Sybils, making the robust selection of trust seeds an arduous task.

The present invention addresses important limitations of existing social-graph-based defences, leveraging its efficient support for multiple trust seeds to improve performance in OSNs that have a multi-community structure and to reduce to the false positive resulting from the existence of multiple non-Sybil communities. It does so by initializing trust in each major community, so that the non-Sybil users are not starved of trust even if the inter-community connectivity is weak. Existing social-graph-based defences are sensitive to the multi-community structure in the non-Sybil region due to the limited connectivity between communities, so they may misclassify non-Sybils that do not belong to the communities of their trust seeds as Sybils. Inspecting random users for trust seeds to cover most of communities in the non-Sybil region would require a prohibitive manual inspection workload. Instead, the present invention applies an efficient community detection but not Sybil-resilient algorithm to obtain an estimation of the community structure. Subsequently, it leverages the community information to guide our seed selection, i.e., to place a few trust seeds in each community.

Moreover, the invention allows a very flexible seed selection for distributing seeds among communities, as any non-Sybil node can be a seed, which makes it harder for attackers to target the trust seeds. Seeding trust on multiple nodes makes the invention more robust to seed selection errors; incorrectly designating a node that is Sybil or close to Sybils as a seed causes only a small fraction of the total trust to be initialized in the Sybil region. OSN providers can easily identify non-Sybil users to seed trust by manually inspecting a few users. This stems from the fact that in the stationary distribution, the probability to land on each node is independent of the location of the trust seeds, thus, any set of non-Sybil users is eligible for the trust seeds. The present invention can work with an arbitrary number of non-Sybil seeds regardless of their locations. Besides, effectiveness decreases only moderately as the Sybil's distance from the trust seeds decreases.

The present invention relies on the fact that OSN Sybils are connected to to the non-Sybil region via limited edges, while BotGraph assumes that the bot-user group is tightly connected. The present invention relies on the assumption that the connectivity between Sybils and non-Sybil users is limited and this is why the effectiveness of the Invention is not sensitive to the number of Sybils or the inter-Sybil connectivity.

Since the present invention seeds all trust in the non-Sybil region and terminates power iterations early, it strictly limits the trust that flows into the Sybil region by the small number of attack edges. This is because the mixing time of the entire social graph is much longer than that of the non-Sybil region. Consequently, initializing the power iteration with nodes in the non-Sybil region, and terminating it early before it converges, results in non-Sybil users obtaining higher trust than that in the stationary distribution, whereas the reverse holds for Sybils.

Since the present invention ranks nodes by degree-normalized trust, this eliminates the node degree bias. This invention gives each non-Sybil node almost identical degree-normalized trust. This reduces false positives due to the non-Sybil nodes that have a low degree. This is because after O(log n) power iterations, the trust distribution in the non-Sybil region approximates the stationary distribution in that region, i.e., each non-Sybil node obtains an amount of trust proportional to its degree. Normalizing a node's trust by its degree eliminates the bias that a low-degree non-Sybil node may get a lower total trust than a high-degree Sybil node, making a non-Sybil user rank higher than a Sybil with high probability. The removal of the degree bias simplifies the Sybil/non-Sybil classification, i.e., all non-Sybil users are in the same class with almost identical degree-normalized trust. This is in contrast to prior trust inference schemes, e.g., EigenTrust, TrustRank, PageRank and Personalized PageRank, which assign wildly varying trust scores to non-Sybil users.

The present invention ensures that the number of Sybils ranked higher than the non-Sybil nodes is upper bounded by O(log n) per attack edge. At a high level, this result holds because after early termination, the trust distribution in the entire graph G has not reached its stationary distribution. Since the trust distribution is started from the non-Sybil region, the Sybil region (in aggregate) gets only a fraction f (f<1) of the total amount of trust it should obtain in the stationary distribution. Further, as the total amount of trust is conserved in the entire graph, the non-Sybil region obtains an aggregate amount of trust that is c (c>1) times higher than that in the stationary distribution. Since the non-Sybil region is well connected, each non-Sybil node obtains approximately identical degree-normalized trust, i.e., $$f \frac{T_G}{2m}$$

is a node's degree-normalized trust in the stationary distribution. The amount of degree-normalized trust obtained by each Sybil node depends on how Sybils connect to each other. However, since the aggregate amount of trust of the Sybil region is bounded, on average, each Sybil obtains $$c \frac{T_G}{2m}, \text{ where } \frac{T_G}{2m}$$

degree-normalized trust, which is less than a non-Sybil node's degree-normalized trust. Hence, in the present invention, at most O(log n) Sybils, per attack edge, obtain higher degree-normalized trust than non-Sybil nodes.

Random walks in the present invention do not jump to random users, because this would allow Sybils to receive trust in each iteration. Also, these random walks do not jump to the trust seeds, because this would assign to Sybils that are close to the trust seeds higher trust than to non-Sybils far from the seeds, making the seed selection intractable. In contrast, PageRank's random walks jump to random users, and EigenTrust/TrustRank's walks jump to trust seeds.

Unlike abuse-report-driven manual inspection, the present invention has the to potential to remove fakes before they annoy users. The proper mix of the two approaches (and probably other) methods would address both the problem of hidden fakes (mostly detected by our method) and of annoying and noisy fakes that have been reported for abuse.

These and other advantages will be apparent in the light of the detailed description of the invention.

DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
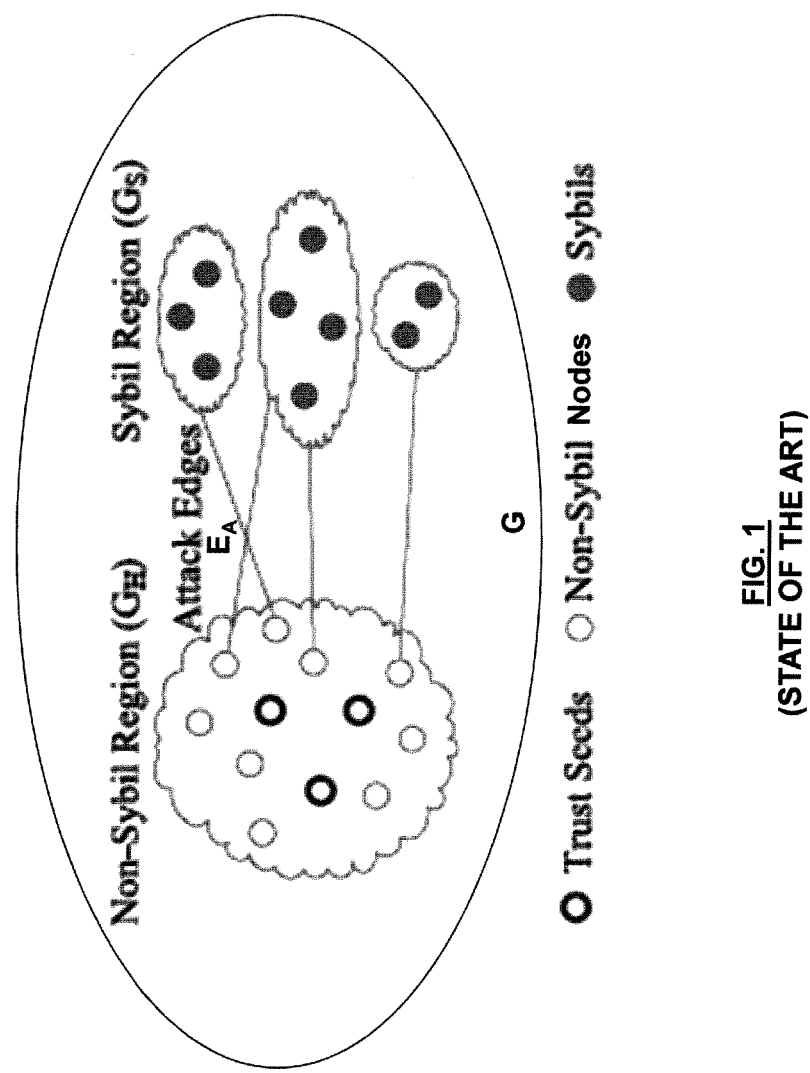
FIG. 1 shows a schematic diagram of a social network topology illustrating non-Sybil nodes, Sybil nodes and attack edges between them, as known in prior art.

FIG. 1 presents a social graph G comprising a non-Sybil region $G_H$ formed by the non-Sybil or honest nodes of an OSN and a Sybil region $G_S$ formed by the Sybil or fake nodes of the OSN, both regions being separated but interconnected by attack edges $E_A$. Thus, an OSN is modelled as an undirected graph G=(V,E), where G denotes the social network topology comprising vertices V that represent users at nodes and edges E that represent trust relationships between users. Bilateral social relationships are considered, where each node in V corresponds to a user in the network, and each edge in E corresponds to a bilateral social relationship. Friendship relationship can be represented as an undirected edge E in the graph G and said edge E indicates that two nodes trust each other to not be part of a Sybil attack. Furthermore, the (fake)

friendship relationship between an attacker or Sybil node and a non-Sybil or honest node is an attack edge $E_A$. These relationships must be understood by users as having security implications, to restrict the promiscuous behaviour often observed in current social networks, where users often flag strangers as their friends In the social graph G, there are n=|V| nodes, m=|E| undirected edges, and a node v has a degree of deg(v).

Social network topologies are relatively static and it is feasible to obtain a global snapshot of the network. Therefore, any node of set V knows the complete social to graph G. Friendship relationships are already public data for popular social networks, e.g., Facebook or Tuenti. Therefore, the OSN provider has access to the entire social graph G.

The method for detecting Sybil nodes in a social network, OSN, proposed here takes as an input the social graph G and the purpose is to rank or label nodes as honest is (non-Sybil) or dishonest (Sybil) nodes.

The underlying formal model casts the problem of detecting Sybil nodes in the context of Bayesian Inference: given a set of stated relationships between nodes. In this threat model, attackers can launch Sybil attacks by creating many fake identities. Thus, the node set V is divided into two disjoint sets H and S, representing non-Sybil and Sybil users respectively, forming the non-Sybil region $G_H$ as the subgraph induced by the honest user set H, which includes all non-Sybil users and the links among them, and similarly, the Sybil region $G_S$ is the subgraph induced by Sybil user set S. The non-Sybil and the Sybil regions, $G_H$ and $G_S$, are connected by a limited number g of attack edges $E_A$ between Sybils and non-Sybil users.

The social graph G is undirected. The non-Sybil region $G_H$ is well connected and non-bipartite. In this case, random walks on the graph G can be modelled as an irreducible and a periodic Markov chain, which is guaranteed to converge to a stationary distribution in which the landing probability on each node after sufficient steps is proportional to its degree.

Also, it is assumed that Sybils establish only a limited number of attack edges due to the difficulty in soliciting and maintaining reciprocal social relationships and most of their social connections are established with other fakes. Furthermore, Sybil defences can be deployed over a social graph that includes only edges that reflect strong human relationships. To this end, OSNs can develop user interfaces that encourage the creation of links that reflect strong social ties or facilitate their inference. For instance, Google+ may consider only those social connections where the adjacent identities appear in mutually close circles. The limited number of attack edges results in a sparse cut between the non-Sybil and the Sybil region, $G_H$ and $G_S$, in FIG. 1. Since the well-connected non-Sybil region $G_H$ is unlikely to have such a sparse cut, there should be a significant difference between the mixing time of the non-Sybil region $G_H$ and the entire graph G. Therefore, another starting assumption in the model is that the non-Sybil region $G_H$ is fast mixing, i.e., its mixing time is O(log n).

Figure 2:
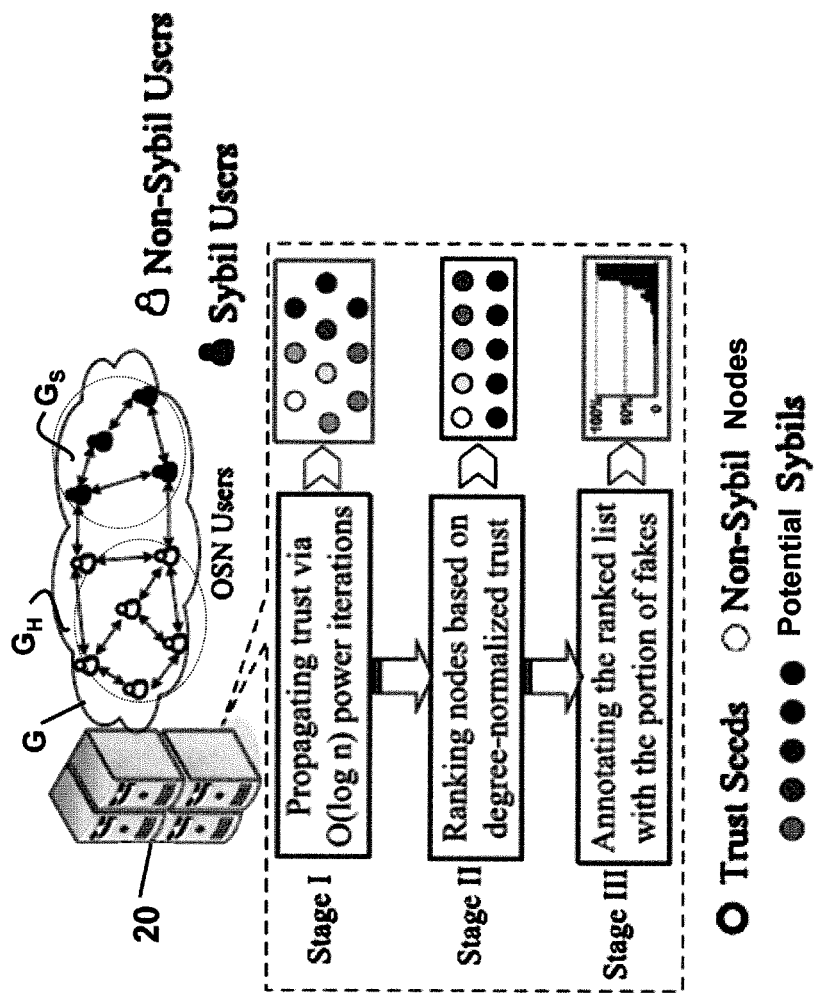
FIG. 2 presents a block diagram of the stages for detecting Sybil nodes in an online social network, in accordance with a preferred embodiment of the invention.

FIG. 2 shows an OSN provider 20 with access to every OSN users, non-Sybil and Sybil ones, in the social graph G, separated by the non-Sybil and the Sybil regions respectively, $G_H$ and $G_S$. The proposed system for detecting Sybils in the OSN relies on the observation that an early-terminated random walk starting from non-Sybil node(s) in a social network has a higher degree-normalized (divided by the degree) landing probability to land at a non-Sybil node than a Sybil node. This observation holds because the limited number g of attack edges $E_A$ forms a narrow passage from the non-Sybil region $G_H$ to the Sybil region $G_S$ in a social graph G. When a random walk is sufficiently long, it has a uniform degree-normalized probability of landing at any node, a property referred to as the convergence of a random walk. However, a shortened random walk originating from a non-Sybil node tends to stay within the non-Sybil region $G_H$ of the network, as it is unlikely for it to traverse one of the relatively few attack edges $E_A$.

The proposed system and method according to an embodiment of the invention unveils users that are suspected to be Sybils after three stages, shown in FIG. 2 to and summarized as follows:

In Stage I, through w=O(log n) power iterations, trust flows out from known non-Sybil nodes (trust seeds) and spreads over the entire network with a bias towards the non-Sybil region $G_H$.

In Stage II, nodes are ranked based on their degree-normalized trust.

In Stage III, each interval of the ranked list (an interval of the ranked list being defined as a contiguous ranked subset of the ranked list) is annotated with the portion (percentage) of fake nodes in it to assist OSN providers to focus their manual inspection efforts or regulate the frequency with which they send CAPTCHAs to suspected users.

In FIG. 2, black users are Sybils and the node brightness after trust propagation indicates node trust. Nodes are ranked in the social graph G according to the degree-normalized probability of a short random walk that starts from a non-Sybil node to land on them. Lower-ranked nodes are screened out as potential fake users. Power iteration is used to efficiently calculate the landing probability of random walks in large graphs. This is in contrast to prior art that used a large number of random walk traces obtained at a large computational cost. For ease of exposition, the probability of the random walk to land on a node is referred as the node's trust and the initial probability of starting from the trust seeds is referred to the initial trust vector. Next each stage shown in FIG. 2 is described in detail.

Stage I: Trust Propagation Via Power Iteration

Power iteration involves successive matrix multiplications where each element of the matrix represents the random walk transition probability from one node to a neighbor node. Each iteration computes the landing probability distribution over all nodes as the random walk proceeds by one step. The power iterations are early terminated after O(log n) steps, where n is the number of nodes in the social graph G. The maximum number of iterations needed to reach the stationary distribution is equal to the graph's mixing time. In an undirected graph, if a random walk's transition is probability to a neighbour is uniformly distributed, the landing probability on each node in the stationary distribution is proportional to its degree. The proposed method for detecting Sybils exploits the mixing time difference between the non-Sybil region $G_H$ and the entire graph G to distinguish Sybils from non-Sybils. If seeding all trust in the non-Sybil region $G_H$, then trust can flow into the Sybil region $G_S$ only via the limited number g of attack edges $E_A$. Thus, the mixing time of the social graph G is much longer than the mixing time of the non-Sybil region $G_H$. If power iteration is terminated early before it converges, non-Sybil users will obtain higher trust than that in the stationary distribution, whereas the reverse holds for Sybils.

$T^{(i)}(v)$ is defined here as the trust value on node v after i iterations. Initially, the total trust, denoted as $T_G$, is evenly distributed on K (K>0) trust seeds $\hat{v}_1, \hat{v}_2, \ldots, \hat{v}_K$:

$$T^{(o)}(v) = \begin{cases} \dfrac{T_G}{K} & \text{if node } v \text{ is one of the } K \text{ trust seeds} \\ 0 & \text{else} \end{cases}$$

Seeding trust on multiple nodes leads to more robustness of the system to seed a selection errors, as incorrectly designating a node that is Sybil or close to Sybils as a seed causes only a small fraction of the total trust to be initialized in the Sybil region $G_S$.

During each power iteration, a node first evenly distributes its trust to its neighbors. It then collects trust distributed by its neighbors and updates its own trust accordingly. The process is shown below. Note that the total amount of trust $T_G$ remains unchanged.

$$T^{(i)}(v) = \sum_{(u,v)\in E} \frac{T^{(i-1)}(u)}{\deg(u)}$$

With sufficiently many power iterations, the trust vector converges to the stationary distribution:

$$\lim_{i\to\infty} T^{(i)}(v) = \frac{\deg(v)}{2m} T_G$$

However, the proposed method terminates the power iteration after $w=O(\log n)$ steps, thus before convergence. This number of iterations is sufficient to reach an approximately uniform distribution of degree-normalized trust over the fast-mixing non-Sybil region $G_H$, but limits the trust escaping to the Sybil region $G_S$.

Figure 3:
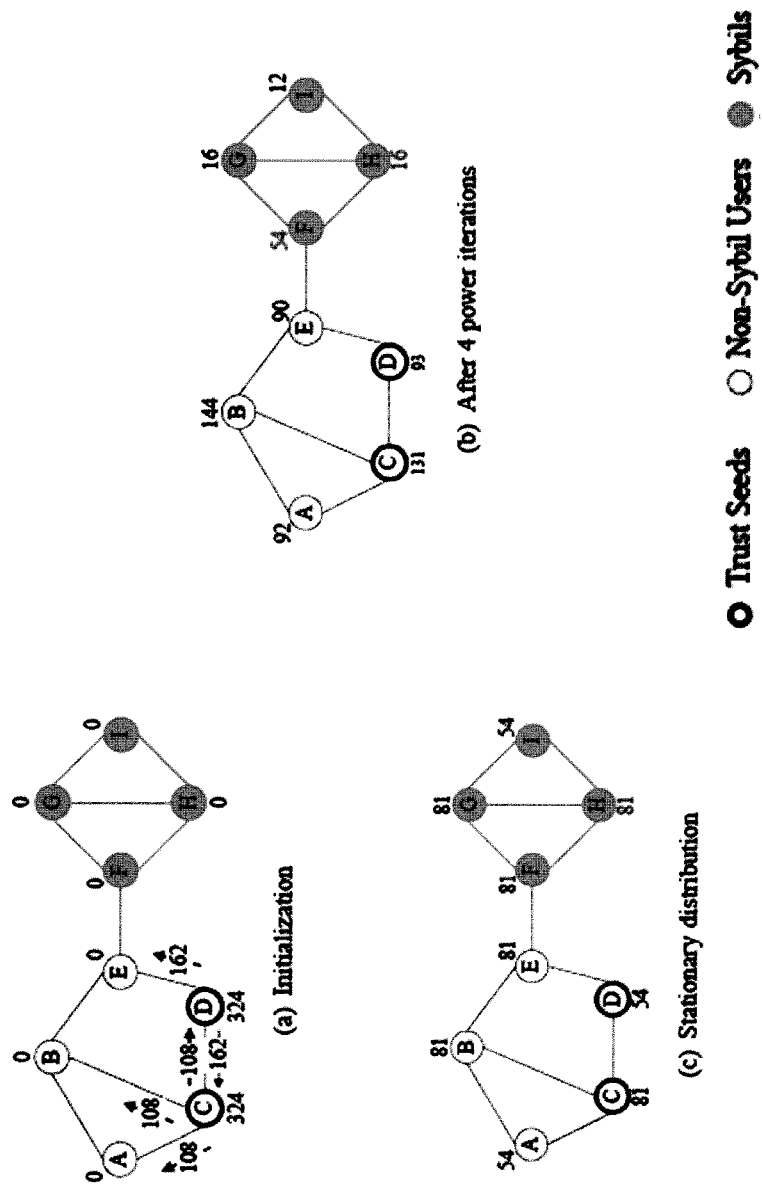
FIG. 3 shows trust propagation between non-Sybil and Sybil nodes through power iterations, in three samples of the power iteration process, according to a possible embodiment of the invention.

FIG. 3 illustrates the process of trust propagation according to a possible embodiment of the invention. In FIG. 3(a), an example of the process Initialization is shown, where the method initially seeds a total trust $T_G=648$ on the non-Sybil nodes C and D. In the example of FIG. 3(a), $T_G$ is not normalized to 1 for ease of exposition. After four power iterations, all non-Sybil nodes (A, B, C, D, E) obtain higher degree-normalized trust than any Sybils {F, G, H, I}, as shown in FIG. 3(b). However, as the examples of prior art and shown in FIG. 3(c), if the power iterations are continued up to converge (more than 50 iterations), to the stationary distribution, the Sybils have similar trust as the non-Sybil nodes, and each node's trust is only proportional to its degree.

Stage II: Ranking Nodes by Degree-Normalized Trust

After $w=O(\log n)$ power iterations, nodes are ranked by their degree-normalized trust to obtain a ranked list.

A node v's degree-normalized trust $\hat{T}$, is defined as:

$$\hat{T}_v = \frac{T^{(w)}(v)}{\deg(v)}$$

Stage III: Annotating the Ranked List of Nodes with Portions of Sybils

The security guarantee in the present invention is based on the limited attack edges that Sybils can establish. Consequently, the stage II of the proposed method may rank Sybils that obtain many social links to non-Sybil users higher than non-Sybil users. This is true for all social-graph-based defences. It results in even the top and bottom intervals of the ranked list to contain a non-negligible portion of real and fake accounts, respectively. Consequently, an OSN cannot simply identify a pivot in the ranked list below which all nodes are fake, and it still has to rely on manual inspection. At the same time, OSNs have limited resources for manual inspection. In order to aid OSN providers 20 to adjust their focus based on their varying fake detection needs, according to a possible embodiment of the invention, the method annotates intervals in the ranked list with fake portions, that is, the ranked list is a divided into intervals of nodes, having each interval associated with a portion of Sybils in the interval. In particular, random users are sampled in each interval of a particular size and the method reports a portion of fakes in each interval after manual inspection. For example, let us assume a ranked list of 1000 nodes. The last 100 users are considered the last 100-node interval. The $800^{th}$ to the $900^{th}$ user are the to second to last interval. If we randomly sample 10 users from the second to last interval and we find that 5 of them are Sybils, we annotate this interval as having 50% portion of fakes.

With these annotations, OSN providers can decide on which interval (part) of the is ranked list their human verifiers should locus. If it is urgent for an OSN provider to discover many fakes with only limited resources, it is better to investigate the intervals closer to the bottom of the list, which have high portions of fakes, i.e., nodes v with a degree-normalized trust $\hat{T}_v$ that $\hat{T}_v$ translated to % value which is low. The portion of fakes decreases as we go up the ranked list. Furthermore, if the OSN provider wishes to also unveil Sybils closer to the non-Sybil region $G_H$, it is better to investigate intervals with a lower portion of fakes. These annotations can also be used to regulate the frequency of CAPTCHAs and other challenges sent to suspicious users by the OSN provider. In addition, the annotations can help human verifiers to decide on accounts that do not exhibit sufficient evidence on whether they are fake.

A possible embodiment of the Invention is implemented in a parallel computing framework and applied to a possible social network scenario with a very large number n of users on a cluster of commodity machines. The above described a method for detecting Sybils in OSNs can be implemented using the MapReduce parallel computing framework, defined by Dean et al. in "MapReduce: Simplified Data Processing on Large Clusters" OSDI, 2004. This implementation enables an OSN provider to timely process social network graphs G with hundreds of millions of users on a duster of commodity machines. A graph at this scale does not fit in the memory of a typical commodity machine, and even if it does, it will take a long time to finish the proposed computation of stages I-III on a single machine. Therefore, the entire graph G is divided into multiple partitions, so that each of them fits into the hardware of a commodity machine. Note that the complexity of the proposed method is dominated by the first two stages: stage I, trust propagation via O(log n) power is iterations, and stage II, node ranking based on degree-normalized trust. Together they have O(n log n) computational complexity.

At the first stage, stage I, trust propagation via power iterations, trust splitting and trust aggregation at each iteration are inherently parallelizable. Therefore, each iteration can be treated as a MapReduce job, and multiple map tasks can be created to split trust and multiple reduce tasks can be created to aggregate trust simultaneously. For each graph chunk which contains a subset of nodes, a map task splits trust on each node. It emits intermediate output in a form of <neighborID, trust>. Reduce tasks aggregate the intermediate tuples targeting to the same node and eventually emit <nodeID, trust> to update the trust on each node. In the last iteration, the total trust is divided by node degree and this generates degree normalized trust, as described before.

To perform consecutive power iterations, the reduced phase needs to embed the updated node trust in the graph structure, so that the map phase in next iteration can be aware of the trust reallocation. A naive implementation can shuffle the graph 6 structure between map and reduce tasks. Instead, the shuffling of the graph structure is bypassed by using a design pattern, called Schimmy (by Lin et al. "Design Patterns for Efficient Graph Algorithms in MapReduce" MLG, 2010), the basic of which is to draw a mapping between graph chunks and reduce tasks based on the partitioner, such that a reduce task reads a chunk of graph structure directly from disk and to update it accordingly.

At the second stage, stage II, ranking based on degree-normalized trust, the most efficient sorting algorithms can be used and they have a complexity of O(n log n) on a single machine. Fortunately, MapReduce is by nature an efficient distributed sorting framework because it shuffles and sorts intermediate tuples by keys before shipping is them to reduce tasks. A MapReduce job can be used to complete ranking based on degree-normalized trust. Elements in the tuples generated by trust propagation are reversed in the map tasks of ranking, i.e., nodeID and trust are switched (note that the trust is degree-normalized trust), so that the MapReduce framework can sort tuples based on degree normalized trust. A reduce task then collects all tuples and yields a sorted sequence of nodes in an non-decreasing order of trust. Since sorting a subset of tuples is completed in parallel in MapReduce framework and merging sorted subsets of tuples has a linear cost, the total cost of the ranking stage is substantially decreased. To further reduce the intermediate results that need to be shuffled between map tasks and reducer tasks, other optimization techniques for graph algorithms in MapReduce can be incorporated, e.g., in-mapper combining and smart partitioning, described by Lin et al.

Figure 4:
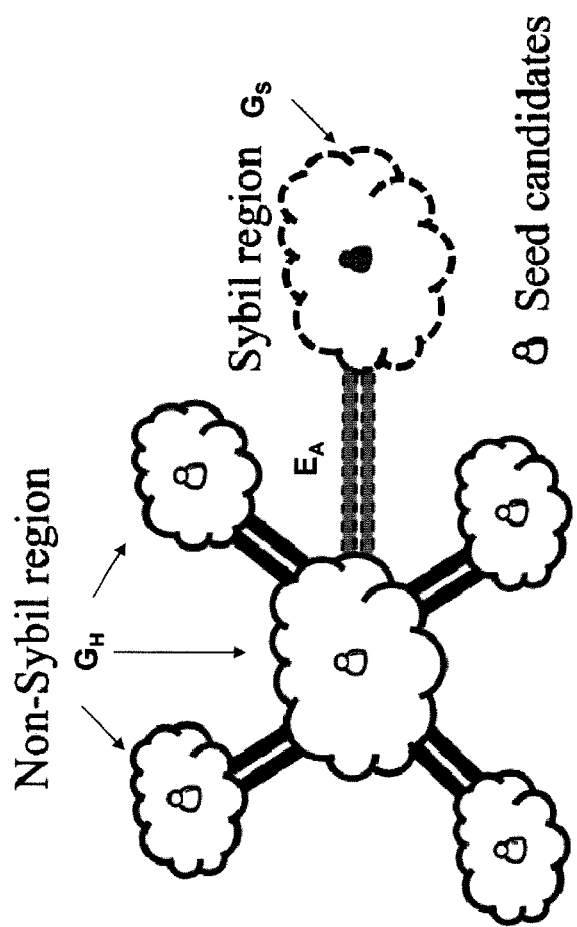
FIG. 4 shows trust seed distribution into multiple communities, according to another possible embodiment of the invention.

The proposed method can work effectively with any arbitrary number of non-Sybil seeds regardless of their locations and so, it is applicable for estimating a multi-community structure and distributing seed among the multiple communities, as illustrated in FIG. 4. In each identified community, a small number of nodes is randomly inspected, (e.g., only 100 nodes approximately in total for the 11-million-node Tuenti social network) and the method only seeds trust (degree-normalized trust) at the nodes that pass the verification. The Sybil seed candidates, in black in to FIG. 4, cannot pass the inspection. This achieves a good seed coverage over the non-Sybil region $G_H$ and avoids initiating trust in the Sybil region $G_S$.

Louvain method ("Fast Unfolding of Communities in Large Networks" by Blondel et al., Journal of Statistical Mechanics: Theory and Experiment, 2008.) can be used to efficiently detect communities. Louvain method iteratively groups closely connected is communities together to improve the partition modularity. In each iteration, every node represents a community, and well-connected neighbor nodes are combined into the same community. The graph is re-constructed at the end of each iteration by converting the resulting communities to nodes and adding weighted links to reflect the level of connectivity among those communities. For instance, the original Tuenti graph has 11 million nodes with 1.4 billion links. The first iteration outputs a graph with only 120K nodes and 1.5 million edges. The iterations can be further reduced by simply tweaking this multi-level aggregation mechanism to stop as soon as a manageable set of communities for seed candidate inspection is obtained. In addition, Louvain method can be parallelized on commodity machines. The cost for estimating communities by Louvain method is O(m), because each iteration in Louvain method has a computational cost linear to the number m of edges and the graph shrinks rapidly with only a few number of iterations. Compared to Louvain method, the present method proposed here, as the node degree in OSNs is always limited, has a cost for estimating communities equal to O(n), n denoting the number of nodes and, hence, the overall computational cost is O(n log n), irrespective of the number of trust seeds, i.e., regardless the multi-community structure.

Figure 5:
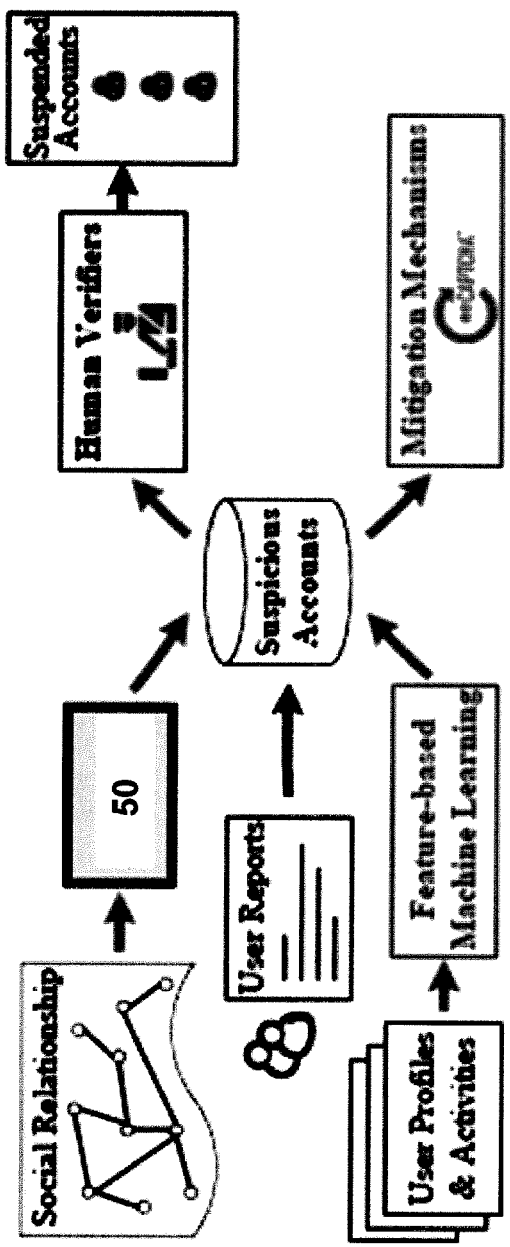
FIG. 5 shows a block diagram of system architecture for Sybil defence in an online social network that integrates a method for detecting Sybil nodes, according to a is possible application of the invention.

FIG. 5 illustrates the proposed solution for detecting Sybils as a part of the Sybil defence toolchain of an OSN provider. The OSN provider can generate a database of suspicious accounts based on the input results from the proposed method, which in turn uses the social network topology and relationships as input. These results can be combined or correlated with the results from a feature-based machine learning algorithm that takes into account the user profiles and activities, and they all can be correlated with user reports to obtain the database of suspicious accounts, on which is the human verifiers can work in order to proceed to suspend detected Sybil accounts. Also, the OSN provider can trigger mitigation mechanisms as CAPTCHAs using the data of these suspicious accounts. In this overall framework, shown in FIG. 5, employed by OSN providers to ensure the health of their user base, the proposed method and system can be a component 50 which further complements other approaches (e.g., Machine-Learning algorithms or user abuse reports) to enable more targeted searching through the user base. Automated suspect user inference is typically followed by challenging the suspects with CAPTCHAs, or with manual verification, which results in account termination. None of the proposals existing in prior art can play the role of the proposed component 50 in FIG. 5. The reason is that prior art schemes either do not exhibit equivalent accuracy or they incur a prohibitive computational cost, as explained before. In experiments performed in a OSN provider like Tuenti, the leading OSN in Spain, using the proposed method, it detects Sybils with at least 20% lower false positive and negative rates than Eigen-Trust, which is the second best contender in most of the attack scenarios. Almost 100% and 90% of the 50K and 200K accounts, respectively, which were designated as most suspicious in the experiments using the proposed method, were indeed fake. This compares very favorably to the 5% hit rate of Tuenti's current user-report-based approach.

The invention claimed is:

1. A method for detecting fake accounts in online social networks, comprising:
  associating an online social network with a social graph G which comprises two disjoint regions, a non-Sybil region $G_H$ and a Sybil region $G_S$, characterized in that the method further comprises:
  computing, by a computer device, a trust value $T^{(i)}(v)$ through i power iterations on each node v of the social graph G, where i=0, 1, . . . O(log n) and n being the number of nodes in the social graph G;
  the power iterations distribute the trust value $T^{(i)}(v)$ from each node v to its neighbour nodes, through the entire social graph G with a bias towards the non-Sybil region $G_H$ by distributing the trust value from at least one node of the non-Sybil region $G_H$ selected as trust seed;
  after an early ending number w=O(log n) of power iterations, ranking is nodes by a degree-normalized trust to obtain a ranked list of nodes, the degree-normalized trust of the node v being computed based on dividing the trust value $T^{(i)}(v)$ by a degree deg(v) of the node v in the social graph G, i=w and the degree deg(v) being the number of adjacent nodes to node v in the social graph G;
  detecting fake accounts in the Sybil region $G_S$ based on the obtained ranked list.

2. The method according to claim 1 wherein distributing the trust value $T^{(i)}(v)$ through the entire social graph G comprises:
   selecting K nodes of the social graph G, K≥1, as trust seeds;
   setting a total trust $T_G$ of the social graph G;
   computing an initial trust value $T^{(o)}(v)$ as:

$$T^{(o)}(v) = \begin{cases} \dfrac{T_G}{K} & \text{if node } v \text{ is one of the } K \text{ trust seeds} \\ 0 & \text{else} \end{cases}$$

collecting trust values distributed by the neighbour nodes u of the node v;
   according to the collected trust values, updating the trust value $T^{(i)}(v)$ to be distributed using the expression:

$$T^{(i)}(v) = \sum_{(u,v)\in E} \frac{T^{(i-1)}(u)}{\deg(u)}$$

where E is a set of edges connecting nodes of the social graph G.

3. The method according to claim 2, wherein distributing the trust value $T^{(i)}(v)$ through the entire social graph G comprises selecting any node of the non-Sybil region $G_H$ as trust seed.

4. The method according to claim 2, wherein distributing the trust value $T^{(i)}(v)$ through the entire social graph G comprises selecting multiple nodes of the entire social graph G as trust seeds.

5. The method according to claim 1, wherein the degree-normalized trust $\hat{T}_v$ of the node v is computed as:

$$\hat{T}_v = \frac{T^{(w)}(v)}{\deg(v)}.$$

6. The method according to claim 1, wherein the degree-normalized trust is substantially equal for all nodes of the non-Sybil region $G_H$.

7. The method according to claim 1, wherein the power iterations are initialized with nodes of the non-Sybil region $G_H$.

8. The method according to claim 1, wherein the detection of fake accounts using the ranked list obtained by ranking nodes by their degree-normalized trust comprises assigning intervals of a certain size in the ranked list to a fake portion as determined by manual inspection.

9. A hardware system for detecting fake accounts in online social networks, wherein an online social network has associated a social graph G comprising two disjoint is regions, a non-Sybil region $G_H$ and a Sybil region $G_S$, the hardware system characterized by further comprising:
   computational means adapted to compute a trust value $T^{(i)}(v)$ through i power iterations on each node v of the social graph G, where i=0, 1, ... O(log n) and n being the number of nodes in the social graph G;
   communication means adapted to distribute the trust value $T^{(i)}(v)$ by the power iterations, obtained by the computational means, from each node v to its neighbour nodes, through the entire social graph G with a bias towards the non-Sybil region $G_H$ distributing the trust value from at least one node of the non-Sybil region $G_H$ selected as trust seed;
   node ranking means adapted to rank nodes, after an early ending number w=O(log n) of power iterations, by a degree-normalized trust to obtain a ranked list of nodes, the degree-normalized trust of the node v being computed based on dividing the trust value $T^{(i)}(v)$ by a degree deg(v) of the node v in the social graph G, i=w and the degree deg(v) being of the number of adjacent nodes to node v in the social graph G;
   account detection means adapted to detect fake accounts in the Sybil region $G_S$ based on the ranked list obtained by the node ranking means.

10. The system according to claim 9 wherein the computational means are to adapted to:
    select K nodes of the social graph G, K≥1, as trust seeds;
    set a total trust $T_G$ of the social graph G;
    compute an initial trust value $T^{(o)}(v)$ as:

$$T^{(o)}(v) = \begin{cases} \dfrac{T_G}{K} & \text{if node } v \text{ is one of the } K \text{ trust seeds} \\ 0 & \text{else} \end{cases}$$

collect trust values distributed by the neighbour nodes u of the node v;
    according to the collected trust values, update the trust value $T^{(i)}(v)$ to be distributed using the expression:

$$T^{(i)}(v) = \sum_{(u,v)\in E} \frac{T^{(i-1)}(u)}{\deg(u)}$$

where E is a set of edges connecting nodes of the social graph G.

11. The system according to claim 10, wherein the computational means are adapted to select any node of the non-Sybil region $G_H$ as trust seed.

12. The system according to claim 10, wherein the computational means are adapted to select multiple nodes of the entire social graph G as trust seeds.

13. The system according to claim 9, wherein the computational means are adapted to compute the degree-normalized trust $\hat{T}_v$ of the node v as:

$$\hat{T}_v = \frac{T^{(w)}(v)}{\deg(v)}.$$

14. The system according to claim 9, wherein the degree-normalized trust is substantially identical to all nodes of the non-Sybil region $G_H$.

15. The system according to claim 9, wherein the computational means are adapted to initialize the power iterations with nodes of the non-Sybil region $G_H$.

16. The system according to claim 9, wherein the fake account detection means are adapted to assign intervals of a certain size in the ranked list to a fake portion determined by manual inspection based on the degree-normalized trust of the nodes belonging to the intervals.

17. A non-transitory digital data storage medium storing a computer program product comprising instructions causing a computer executing the program, to perform all steps of a method comprising:
    associating an online social network with a social graph G which comprises two disjoint regions, a non-Sybil region $G_H$ and a Sybil region $G_S$, characterized in that the method further comprises:

computing, using a computing device, a trust value $T^{(i)}(v)$ through i power iterations on each node v of the social graph G, where i=0, 1, . . . O(log n) and n being the number of nodes in the social graph G;

the power iterations distribute the trust value $T^{(i)}(v)$ from each node v to its neighbour nodes, through the entire social graph G with a bias towards the non-Sybil region $G_H$ by distributing the trust value from at least one node of the non-Sybil region $G_H$ selected as trust seed;

after an early ending number w=O(log n) of power iterations, ranking nodes by a degree-normalized trust to obtain a ranked list of nodes, the degree-normalized trust of the node v being computed based on dividing the trust value $T^{(i)}(v)$ by a degree deg(v) of the node v in the social graph G, i=w and the degree deg(v) being the number of adjacent nodes to node v in the social graph G;

detecting fake accounts in the Sybil region $G_S$ based on the obtained ranked list.

\* \* \* \* \*